2,803,963

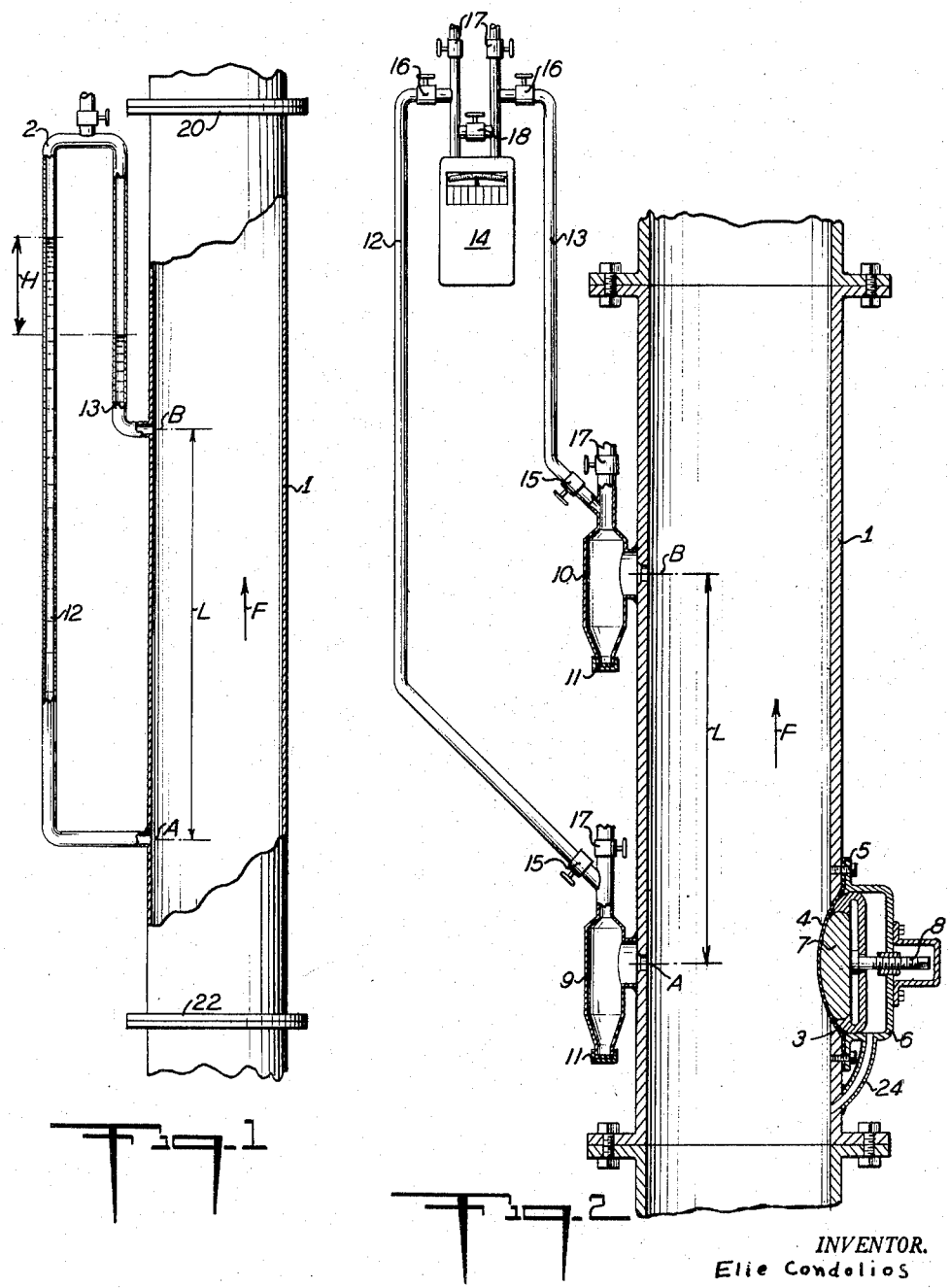

APPARATUS FOR MEASURING THE CONCENTRATION OF HYDRAULICALLY CONVEYED MATERIAL

Elie Condolios, Grenoble (Isere), France, assignor to Etablissements Neyrpic, Grenoble, France, a corporation of France Application January 18, 1954, Serial No. 404,556

Claims priority, application France January 20, 1953

6 Claims. (Cl. 73—438)

This invention relates to transportation of solid particulate materials and more especially to the conveyance in hydraulic channels of solid particulate material, such as excavated materials or the products of mines or quarries. The invention particularly relates to the hydraulic conveyance of such materials in fluid pressure conduits.

In conventional installations in which solid particulate material is conveyed, in many instances the particle size and weight are such that the solid material under the action of gravity tends to settle toward the bottom of the conveying conduit or confining vessel. Such tendency of the particles to separate from the conveying liquid especially occurs in a horizontal extending conduit such as is required in most cases for conveying the material from one location to another. Such locations may be at substantial distances apart and the amount of material thus settling and lagging behind the flowing mixture may be considerable.

The amount of such separation of the particulate material is dependent upon a number of factors, such as the density of the solid materials in relation to the density and viscosity of the conveying liquid. The degree of turbulence developed in th conduit by virtue of the velocity of flow, roughness of the internal surfaces of the conduit, restriction of the flow area and other factors affect the tendency of the solid material to separate. In a horizontal extending conduit in which solid particles are conveyed by water it has been found that separation occurs to the extent that some of the solid material is disposed adjacent and along the bottom portion of the conduit and especially immediately adjacent the walls of the conduit. As is well known, the velocity of liquid flowing in a conduit adjacent the walls is materially less than the velocity of the liquid at the center of the conduit. The result is that the solid material is not moved forward in the conduit at the average velocity of the conveying liquid in the cross section of the conduit but lags behind the liquid flow and tends to accumulate.

This tendency of the solid material to gravitate toward the bottom of the conduit and to lag behind the liquid flow may bring about a condition of building up of the solid material in the cross section of the conduit resulting ultimately in plugging the conduit. Especially with solid materials which are of such character as to be subject to packing such building up of material within the conduit may cause great difficulties in the operation of the conveying system and in the matter of subsequent removal of the solid material which has formed the plug.

In such installations and systems, therefore, it is desirable to indicate as well as to control the quantity of the conveyed material so that, on the one hand, the development of these objectionable conditions may be watched and avoided and, on the other hand, the efficiency of the conveying system may be maintained and the desired amount of the solid material continuously delivered at the place of delivery.

It is, therefore, highly advantageous that the concentration of the solid material in the conveying liquid shall be known and continuously indicated. The concentration of the solid material in the conveying liquid may be determined at the point of delivery by taking a sample of the mixture delivered, separating out the solid material and measuring the amount thereof with respect to the amount of liquid or with respect to the sum of the liquid and solid materials. Such a determination will represent the "as transported" or "as delivered" concentration of the mixture of liquid and solid material flowing through the conduit from the initial receiving point to the the delivery point thereof. This "as delivered" or effective concentration may be taken as if it were the same throughout the length of the conveying conduit since the quantity of liquid received into the conduit is the same as the quantity of the liquid delivered to the delivery point. This "as delivered" concentration, however, does not represent the local conditions of concentration which may exist at different points along the length of the flow conduit and which may vary so that building up and possibly plugging may occur.

It is known that at flow velocities currently utilized in horizontal conduits for hydraulic conveyance of solid particulate materials what may be termed the "spatial" concentration, that is to say, the ratio of the solid material being conveyed to the sum of the liquid and solid material determined at any selected point in the length of the conduit at a given moment, may vary from one point of the conduit to another, and this spatial concentration is different from the "as delivered" concentration of the material as defined above. While this condition exists in generally horizontally extending conduits, in portions of the conduit which may be disposed for generally vertical flow it is found that at currently utilized velocities there is no substantial local slipping of the particles due to gravity with respect to the conveying liquid which tends to produce the marked separation referred to above which occurs in horizontally extending conduits. This avoidance of substantial separation, moreover, may be secured whether the direction of flow is ascending or descending. Furthermore, it is found in such a vertical portion of the flow conduit that the distribution of the "spatial" concentration in a cross section normal to the axis of the conduit ordinarily is substantially uniform and that the "as delivered" concentration of the material conveyed is practically the same as this spatial concentration.

It is a feature of the invention that advantage is taken of these hydraulic phenomena in a vertical conduit portion for measuring and indicating the concentration of solid particulate material being conveyed in a fluid pressure conduit. To this end, a portion of the conduit extending generally vertical is inserted at a suitable place in the horizontal length of the conduit. The vertical extent of this portion is made sufficient so that the presence of the solid material suspended in the liquid may develop substantial modification of the difference in hydraulic pressure at two points vertically spaced along this vertical section of the conduit as compared with the hydraulic head of the conveying liquid alone, as will be more clearly set forth in the explanation to follow and in the description taken in connection with the drawings. The difference in hydraulic head at the two spaced points is measured by a suitable manometric device.

Figure 1 represents a general illustration of a section of a hydraulic conveying conduit in which the concentration of conveyed particles can be measured.

Figure 2 illustrates a preferred form of the measuring apparatus forming the subject matter of this invention, In Fig. 1 a vertically disposed portion 1 of a conduit of substantially uniform diameter throughout its length is shown. This conduit is provided with flanges 20, 22 for connection in a continuous hydraulic conveying conduit through which water is forced under sufficient pressure and at sufficient velocity to convey a particulate material through horizontally extending portions of this conduit as well as through the vertically extending portion 1 thereof.

At points spaced a distance L vertically along this vertical conduit portion tap connections A and B are provided to which respectively a differential manometer 2 is connected by connecting tubes 12 and 13. The connecting tubes 12 and 13 are filled with water as is also the differential manometer. The difference in level H read on this manometer expressed as the height of the water represents the difference in the static pressures $P_A$, $P_B$ taken respectively at the points A and B.

If $w$ is the specific weight of the water, that is the weight per unit volume, then the height of the water in the differential manometer may be represented by the following equations:

1. $$H = \frac{P_A}{w} - \frac{P_B}{w} - L$$

2. $$H = \frac{P_A - P_B}{w} - L$$

If the density of the mixture of water and the particulate material flowing vertically in the conduit 1 is $d$, the difference in static pressure between the pressures at A and at B represented as the height of a column of water is expressed in the following equation:

3. $$\frac{P_A - P_B}{w} = Ld \pm \Delta h$$

according as the flow in the vertical portion of the conduit is ascending or descending, $\Delta h$ being the loss of head due to the friction and other resistances in the conduit.

Substituting Equation 3 in Equation 2 gives the following expression for the value of H read on the manometer corresponding to the pressure difference in the flowing column of the mixture of water and the particulate material:

4. $$H = L(d-1) \pm \Delta h$$

Experience shows that in practice the loss of head $\Delta h$ is substantially the same for a suspension of particulate material in water as for water alone flowing through the same vertical portion of the conduit.

Having regard to the fundamental hydraulic conditions above expressed, the invention provides a method of measuring the "as transported" or "as delivered" concentration of the conveyed material by utilizing the indications of a differential manometer or its equivalent connected between two points of static pressure provided respectively at two cross sections of the conduit spaced vertically at the distance L. Preferably one of these cross sections of the conduit may be adjustable in such a way that the difference of pressure due to venturi effect compensates for the loss of head in the portion of the conduit comprised between the two cross sections at which the measurements are taken. The means for accomplishing this compensation will be described hereinafter with respect to Fig. 2.

If for simplicity of explanation the effect of loss of head is neglected, it will be understood that if water alone were forced to flow through the conduit system including the vertical portion 1 in Fig. 1, the manometer tubes also being filled with water, the reading of the manometer would be zero since the vertical height L within the conduit portion 1 balances a similar height in the tube 12 and the portions of the water columns in the legs of the manometer likewise balance each other since the pressure at the lower ends of these legs at the lever B is the same.

If now, while retaining water alone in the tubes 12 and 13, a suspension in water of a solid particulate material is forced through the conduit system and through the vertical portion 1, the pressures at the points A and B will be modified and the difference of pressure will be a function only of the density $d$ of the mixture within the conduit 1.

5. $$H = (d-1) \times L$$

If the loss of head due to friction and other resistance in the conduit is sufficient to require correction, this may be accomplished by means to be described in connection with Fig. 2 by restricting the upstream cross section A, Fig. 1, or by enlargement of the downstream cross section B so that the pressures respectively at the points A and B are modified to compensate for this loss of head. If the flow of the water and suspended material were vertically downward in Fig. 1, the upstream restriction would be made at point B and the downstream enlargement at point A. Equation 5 then remains as the expression of the difference in static head at points A and B of the vertically flowing mixture.

It may be shown by relatively simple calculation that the "as delivered" concentration $C_T$ of the material conveyed in water may be expressed by the following equation, this material having a specific weight of $w'$ grams per cubic centimeter and the density of the mixture being expressed as grams per cubic centimeter.

6. $$C_T (d-1) \frac{w'}{w'-1} \times 10^3 \text{ grams per liter}$$

If in the equation 5 above the values of H and L are expressed in centimeters, the "as delivered" concentration may be expressed by the following equation when the value of $(d-1)$ of Equation 5 is substituted in Equation 6:

7. $$C_T = \frac{H}{L} \frac{w'}{w'-1} \times 10^3$$

For a given installation and for any given particulate material the values of L and $w'$ are constants. The expression for "as delivered" concentration, therefore, may be given with the value H as the only variable:

8. $$C_T = H \times \text{a constant}$$

It is sufficient, therefore, on the graduations of the manometer to substitute for the values in height of water the values of concentration represented by these heights modified by the constant so as to read directly the "as transported" or "as delivered" concentration of the material being conveyed.

An embodiment of the apparatus for application of the method according to the invention now will be described by way of example with reference to Fig. 2 which is a view partly in cross-section of the assembly of the manometer and the vertical portion of the conduit to which it is connected.

The wall of the vertical portion 1 of the conduit is bored for two pressure connections A and B spaced apart the distance L. The direction of the flow is indicated by the arrow F. An opening 3 of suitable dimensions is provided in the conduit 1 disposed in the plane perpendicular to the axis of the conduit passing through the upstream pressure connection A, for example at a point diametrically opposite this pressure connection.

The opening 3 is closed by a flexible, elastic diaphragm 4, for example of rubber, of which the periphery is clamped tight between the rim of the opening 3 and the flange 5 of a cover 6. A shoe 7 bearing on the diaphragm may be moved within the interior of the cover 6 by means of a stem 8 which is threaded in the wall of the cover 6 through which it passes in such a manner as to be controlled at the exterior of the cover. To equalize the fluid pressure at the two faces of the diaphragm and shoe a connecting tube 24 is provided.

The movement of the shoe 7 makes it possible to move the diaphragm 4 more or less into the interior of the conduit and consequently to control at will the cross section of the passage in the conduit 1 at the pressure connection A.

The holes bored in the conduit wall for the pressure connections A and B advantageously comprise an interior cylindrical part of a few tenths of a millimeter diameter and an enlarged exterior part. There is thus obtained a form which is correct from the point of view of measurement as well as decreasing the risk of plugging the orifices by particles of the conveyed material.

Settling chambers 9 and 10 of sufficiently large dimensions make possible the deposition of particles which may pass through the pressure connection orifices. The chambers 9 and 10 which are provided at their lower part with an emptying stopper 11 have their upper part connected by tubes 12 and 13 to a registering manometer 14. Shut off cocks 15 and 16 provide for demounting the manometer and the tubes while other cocks 17 disposed on lateral tubes serve for removal of air.

When the apparatus of the invention is to be used, it is first made to operate with water. The air is carefully removed and the stem 8 then is operated and the diaphragm 4 is caused to move more or less into the interior of the conduit 1 until the manometer reads zero. The water conveying the material then may be passed through the conduit and the measurement of the concentration will be indicated on the manometer as above described.

The control may be adjusted periodically to take care of wear of the rubber diaphragm 4 or of a modification of the loss of head in the conduit.

It will be understood that other embodiments may be utilized without departing from the scope of the invention, that is to say:

The differential manometer may be replaced by two simple manometers.

The manometer may be a registering manometer or otherwise.

The control of one of the two cross sections at which the measurements are taken may be accomplished, on the one hand, by means effecting restriction of the upstream cross section as above described or, on the other hand, by means capable of providing an enlargement of the downstream cross section.

The means for controlling the cross section may be of any kind, such as, for example, a diaphragm with a variable opening, a register valve with transverse openings, etc.

The cross sections at which the measurements are taken in the vertical conduit portion, properly speaking, need not necessarily be the same. If the flow is susceptible to being reversed, it may be advantageous to choose for the vertical portion of the conduit a piece which is either converging or diverging upwardly, for example, and to place in the cross section of large diameter a regulating device which provides for making this cross section smaller than or larger than the cross section of small diameter of the piece according as the flow takes place in one direction or the other.

Other modifications of the apparatus of the invention may be made within the scope thereof while providing for measurement of the concentration by virtue of the difference in fluid pressure developed in the mixture of conveying liquid and conveyed material flowing in a portion of a fluid pressure conduit which extends generally vertically. Although, for example, this portion of the conduit is shown in the drawing with its length upright, it may be disposed somewhat inclined to the vertical without departing from the invention provided the vertical spacing L of the tubular connections is used to calibrate the manometer reading and the inclination is not sufficient to develop substantial separation of the particulate material which occurs in a horizontal conduit.

I claim:

1. Apparatus for measuring the concentration of solid particulate material conveyed in a fluid pressure conduit by a liquid of given character flowing through said conduit which comprises a portion of said conduit disposed for flow of the liquid and conveyed material therein generally vertically, tubular manometer connections respectively connected to said conduit at points vertically spaced therealong in fluid pressure communication with the interior of said conduit to receive the respective static fluid pressures at said points, said manometer connections being filled with said liquid of given character substantially free from said conveyed material, manometer means connected to said tubular connections for indicating the difference of said static pressures in the mixture of said liquid and the conveyed material in said conduit at said spaced points of connection of said tubular manometer connections to said conduit, and means disposed substantially in the plane of the cross section of said vertical portion of said conduit at a given one of said points of connection of said tubular manometer connections to said conduit for adjusting said cross section so as to compensate for difference of pressure at said two points of connection due to resistance in said conduit caused by said flow of liquid and conveyed material through said conduit between said two points, said adjusting means decreasing said cross section when said given point is disposed upstream with respect to the other of said two points and increasing said cross section when said given point is disposed downstream with respect to said other point.

2. Apparatus for measuring the concentration of solid particulate material conveyed in a fluid pressure conduit by a liquid of given character flowing through said conduit as defined in claim 1 in which said manometer means comprises a differential manometer connected to said tubular manometer connections so as to be responsive to the difference in pressure at said spaced points and to indicate corresponding to the difference in the liquid columns of said manometer the concentration of said mixture of liquid and conveyed particulate material.

3. Apparatus for measuring the concentration of solid particulate material conveyed in a fluid pressure conduit by water flowing through said conduit as defined in claim 1 which comprises means disposed in said tubular manometer connections for separating out the solid material from the mixture of water and solid material entering said connections from said vertical portion of the conduit upon variation of the pressures in said conduit at said points of manometer connection thereto.

4. Apparatus for measuring the concentration of solid particulate material conveyed in a fluid pressure conduit by water flowing through said conduit which comprises a portion of said conduit disposed for flow of water and conveyed material therein generally vertically, said vertical portion of said conduit being of substantially uniform cross section throughout its vertical extent, tubular manometer connections respectively connected to said conduit at points vertically spaced therealong in fluid pressure communication with the interior of said conduit to receive the respective static fluid pressures of the mixture of water and conveyed material at said spaced points, said manometer connections being filled with water substantially free from said conveyed material, a differential manometer having the legs thereof connected respectively to said manometer connections so that the difference of the water columns of said manometer varies with the difference of said static pressures at said two spaced points of connection of said manometer connections to said vertical portion of the conduit, and means disposed substantially in the plane of the cross section of said vertical portion of said conduit at a given one of said points of connection of said tubular manometer connections to said conduit for restricting said cross section for flow of the water and conveyed material through said cross section so as to compensate for difference of pressure at said two points of connection due to resistance in said conduit caused by said flow of water and conveyed material through said conduit between said two points, said given point being disposed upstream with respect to the other of said two points.

5. Apparatus for measuring the concentration of solid particulate material conveyed in a fluid pressure conduit by water flowing through said conduit as defined in claim 4, said means for adjusting the cross section of said vertical portion of said conduit providing an even surface inwardly of the conduit extending generally parallel to the flow of the water and conveyed material through said conduit, said surface being generally continuous with the wall of said conduit.

6. Apparatus for measuring the concentration of solid particulate material conveyed in a fluid pressure conduit by water flowing through said conduit as defined in claim 4 in which said means comprises a flexible diaphragm closing an opening disposed in the wall of said conduit substantially in said plane at said given point of tubular manometer connection, and means for moving said diaphragm transversely of the length of said vertical portion of said conduit to restrict and to enlarge said cross section.

References Cited in the file of this patent
UNITED STATES PATENTS

| | | |
|---|---|---|
| 1,697,867 | Haultain | Jan. 8, 1929 |
| 1,761,295 | Greenfield | June 3, 1930 |
| 2,115,520 | Decker | Apr. 26, 1938 |
| 2,279,254 | Irwin | Apr. 7, 1942 |
| 2,287,027 | Cummins | June 23, 1942 |
| 2,424,654 | Gamble | July 29, 1947 |
| 2,451,604 | Barnes | Oct. 19, 1948 |
| 2,590,215 | Sausa | Mar. 25, 1952 |
| 2,644,329 | Redfield | July 7, 1953 |